(12) United States Patent
Ribbeck

(10) Patent No.: US 7,431,544 B2
(45) Date of Patent: Oct. 7, 2008

(54) DEBURRING BLADE, DEVICE FOR MOUNTING OF DEBURRING BLADES AND BEVEL GEAR CUTTING MACHINE FOR CHAMFERING AND/OR DEBURRING A BEVEL GEAR

(75) Inventor: Karl-Martin Ribbeck, Remscheid (DE)

(73) Assignee: Klingelnberg GmbH, Hückeswagen (DE)

( * ) Notice: Subject to any disclaimer, the term of this patent is extended or adjusted under 35 U.S.C. 154(b) by 547 days.

(21) Appl. No.: 11/129,276

(22) Filed: May 12, 2005

(65) Prior Publication Data

US 2005/0260050 A1 Nov. 24, 2005

(30) Foreign Application Priority Data

May 19, 2004 (DE) .................. 20 2004 008 263 U

(51) Int. Cl.
*B23F 19/10* (2006.01)
(52) U.S. Cl. ................ 409/8; 407/29; 409/26; 409/28; 409/51; 409/57
(58) Field of Classification Search ......... 409/8, 409/25–29, 38–39, 50–51, 57; 407/29; *B23F 19/10*
See application file for complete search history.

(56) References Cited

U.S. PATENT DOCUMENTS

| 1,626,821 | A | * | 5/1927 | Head | |
|---|---|---|---|---|---|
| 1,836,662 | A | * | 12/1931 | Head | |
| 2,135,819 | A | * | 11/1938 | Klix | 409/8 |
| 2,772,602 | A | * | 12/1956 | Christman | 409/8 |
| 3,036,363 | A | * | 5/1962 | Novkov | |
| 3,286,593 | A | * | 11/1966 | Bibbens | 409/8 |
| 4,697,963 | A | * | 10/1987 | Lüuck | |
| 4,784,537 | A | * | 11/1988 | Baker | 408/222 |
| RE38,504 | E | * | 4/2004 | Käsler et al. | |
| 2003/0044246 | A1 | * | 3/2003 | Erickson et al. | |

FOREIGN PATENT DOCUMENTS

| DE | 197 08 601 A1 | * | 9/1998 |
|---|---|---|---|
| DE | 197 44 486 A1 | * | 4/1999 |
| EP | 1022082 A2 | * | 7/2000 |
| JP | 58160017 A | * | 9/1983 |
| JP | 01051223 A | * | 2/1989 |
| JP | 02292121 A | * | 12/1990 |
| JP | 07024635 A | * | 1/1995 |

* cited by examiner

*Primary Examiner*—Daniel W Howell
(74) *Attorney, Agent, or Firm*—McCormick, Paulding & Huber LLP

(57) ABSTRACT

Bevel gear cutting machine for chamfering and/or deburring edges on the teeth of a bevel gear. The gear-cutting machine comprises a workpiece spindle, which receives the bevel gear coaxially of a spindle axis. Furthermore, a deburring spindle is provided for the receiving of a deburring tool and several numerically controllable axes are given. A deburring blade head with several blade cutter-like blade inserts serves as deburring tool, whereby the blade inserts are insertable in recesses of the deburring blade head essentially radially oriented to a deburring spindle axis (E) and comprise edges for chamfering and/or deburring.

12 Claims, 5 Drawing Sheets

DEBURRING BLADE, DEVICE FOR MOUNTING OF DEBURRING BLADES AND BEVEL GEAR CUTTING MACHINE FOR CHAMFERING AND/OR DEBURRING A BEVEL GEAR

CROSS REFERENCE TO RELATED APPLICATIONS

The priority of European Patent Application DE 20 2004 008 263 of May 19, 2004 is claimed, and the disclosure of the European Patent Application is incorporated by reference.

FIELD OF THE INVENTION

The present invention concerns gear-cutting machines and a deburring and/or a chamfering of the tooth edges of bevel gears in the continuous procedure.

BACKGROUND OF THE INVENTION

When manufacturing bevel gears a burr emerges at the outer tooth end due to the cutting processing, and in particular mainly at the concave flanks, because this flank forms a relatively pointed angle with the back surface of the bevel gear tooth. If one would remove the burr at this location only, a very sharp profile edge would remain. Because of the large danger of injury, but also because of the danger of the full hardening when annealing the bevel gears these edges frequently are broken by a chamfer. If this angle is not so pointed, because the bevel gear has e.g. a small spiral angle, it is enough to deburr the edge.

For this chamfering and/or deburring of bevel gears and particularly of ring gears devices are known, which were developed for conventional mechanical bevel gear cutting machines. Already during milling the bevel gears in the intermittent discontinuous processing after each tooth gap the tooth ends are deburred. Or with the continuous milling procedure after gear cutting in a separate processing step chamfering and/or deburring is carried out.

Often also separately standing deburring devices are being employed. With these devices the disadvantage of additional work piece clamping is accepted, in order to obtain more space in the proximity of the workpiece than in a gear-cutting machine, because then the deburring tools can be adjusted more versatile and more simply to the respective workpiece dimensions. In addition more bevel gears can be cut on a gear-cutting machine in same time if they do not also have to be deburred there.

In a well-known deburring device, which is employed directly on a gear-cutting machine, a multi-threaded flying cutter is used, whose axis of rotation is adjusted in such a way that the edge of the impact tooth moves along the profile edge of a bevel gear tooth which is to be chamfered. In this case one does not work using the discontinuous method but at constant workpiece rotation, so that successively each following impact tooth meshes with the next bevel gear gap. The crucial disadvantage is however that not all bevel gears can be deburred on their gear-cutting machine with an impact tooth drill. As a further disadvantage is regarded that special impact tooth drills must be used.

When manufacturing ring gears the ring gear is transferred typically after gear cutting into a change position. During transferring into the change position a deburring cutter is used, which deburrs one tooth profile of the ring gear in the continuous procedure after the other. The deburring cutter is implemented as cut-back solid steel cutter from HSS. It is a disadvantage of this principle that the cutting speed of the HSS steels is limited. Thus the time that expires during the transferring into the change position is normally not sufficient, in order to finish up the deburring of the entire ring gear. It is a further disadvantage that due to the relief the cutter is subject to certain restrictions in the layout of the cutting edge geometry and is thus applicable only for deburring one kind of ring gear. If one wants to deburr another kind of ring gear, either another drill with another geometry must be used, or one uses a drill which is not optimally laid out by geometry of the edges, but is suited for deburring several kinds of ring gears. Due to such a non-optimal layout of the edge geometry the cutters are employable for different kinds of ring gears, but they can be operated only with lower speed, in order to prevent a damage of the edges.

It is also possible to grind the cutters differently, for which purpose these must be sent in usually, which is time-consuming and expensive.

It is hence an object of the invention to develop a bevel gear cutting machine in such a way that very different bevel gears can be chamfered and/or deburred with small technical effort.

A further object of the invention lies in the development of a bevel gear cutting machine in such a way that the longer period spent by the workpiece in the gear-cutting machine for deburring is relatively short.

A further object of the invention lies in the developing of a device for use in a bevel gear cutting machine in order to be able to chamfer and/or to deburr very different bevel gears with small technical effort.

SUMMARY OF THE INVENTION

These objectives are accomplished according to the invention by a gear-cutting machine with a workpiece spindle, which receives the bevel gear coaxially of a spindle axis, a deburring spindle for receiving a deburring tool, and several numerically controllable axes. The machine is provided with a deburring blade head with several bar-like blade inserts as a deburring tool. The blade inserts are attachable to the deburring blade head and are essentially radially oriented to a deburring spindle axis (E) of the deburring spindle, and comprise edges for chamfering and/or deburring. Advantageous embodiments of the invention are disclosed in the specification.

In another aspect, the invention comprises a deburring tool for clamping in a deburring blade head. The deburring tool is a blade insert, which has a bar-like shape and includes a shaft for fixing it on the deburring blade head. The blade insert has a free end, which is designed so that it protrudes, after having been fixed, beyond the deburring blade head. At the free end the insert has an edge for chamfering and/or deburring the edges of a bevel gear.

In still a further aspect the invention comprises a deburring blade head for clamping several blade inserts which have a shaft for clamping and a free end with at least one edge for chamfering and/or deburring the edges of a bevel gear. The deburring blade head comprises a connecting region for fastening the deburring blade head to a deburring spindle of a gear cutting machine. A basic holder of the head extends along a deburring spindle axis (E), and at one end migrates into the exchange area. At another end of the holder several mounting means are provided for clamping the shafts whereby the mounting means are designed so that the blade inserts are essentially radially oriented to the deburring spindle axis (E) after clamping.

This object is according to the invention solved in that a bevel gear cutting machine is equipped with a respective device with blade inserts made of carbide, tool steel or cutting ceramics, to be able to deburr and/or chamfer among other things the edges at the teeth of a bevel gear. Blade inserts made of carbide are particularly preferential.

It is an advantage of the invention that an appropriate bevel gear cutting machine is flexibly applicable. It can be reequipped depending upon need for continuous deburring of most diverse kinds by pinion gears. In addition the use of carbide blade inserts offers a larger freedom in the design of the edges of these blade inserts. The handling of the device according to the invention is particularly simple.

The essential advantages of the invention consist in that with the axis (numerical control axis), numerically controllable by means of a programmable control, almost any arbitrarily shaped bevel gear profile edges can be reached by the edges of the deburring blade inserts. Thus also with a curved profile edge one can create a chamfer and/or the a deburring can be carried out. Secondary burr can be avoided since with appropriate steep inclination of the deburring blade with respect to the bevel gear no large amounts of material have to be planed away, in order to deburr the full tooth height.

It is also advantageous that in accordance with the invention the chamfering or deburring takes place in a continuous process, leading to substantially shorter processing times than with discontinuous processes. Preferably, deburring takes place so quickly that the time for transferring the bevel gear into a change position is sufficient, in order to finish the continuously running process.

BRIEF DESCRIPTION OF THE DRAWINGS

Exemplary embodiments of the invention are described in more detail in the following with reference to the drawings.

DETAILED DESCRIPTION OF THE PREFERRED EMBODIMENTS

Figure 1:
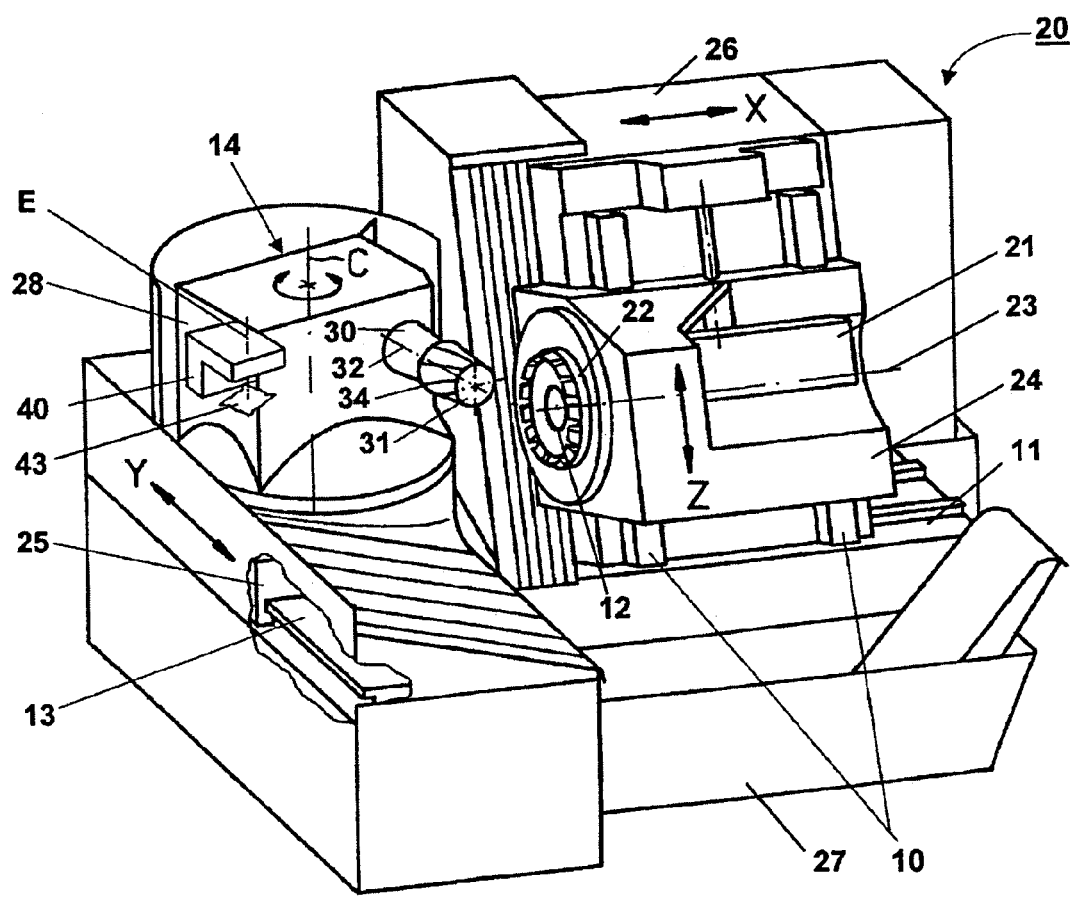
FIG. 1 is a perspective view of a first gear-cutting machine according to the present invention.

FIG. 1 shows the basic structure of a first CNC machine 20, according to the invention, for manufacturing helical bevel gears 31 in perspective representation. Such a machine 20 can be laid out or re-equipped according to the invention; in order to make possible a deburring or a chamfering of the bevel gear 31 by means of special deburring blade inserts 43.1 (see FIG. 2), which are part of a deburring blade head 43 being movable via a setting device 40.

The CNC machine 20 can be built-up as follows. On a machine bed 21 a machine housing 26 is horizontally and linearly guided along a straight axis of coordinates X ($1^{st}$ axis). A first carriage 24 is displaceable in its height by means of a jackscrew actuator 21 on a guidance 10, which is mounted on a side face of the machine housing 26, along a straight Z axis of coordinates (2nd axis). On the machine bed 11 a workpiece spindle carrier 14 is horizontally and linearly guided along a straight Y axis of coordinates (3rd axis), which is perpendicular to the X-axis, with a second carriage 25 on a guidance 13. A first pivotable device 28 with vertical axis C (4th axis) is situated on the carriage 25. The guides 10 of the first carriage 24 and the Z-axis are tilted relative to the vertical one.

The first carriage 24 carries a tool spindle 12 which is mounted rotatably about a tool spindle axis 23 (5th axis). The tool spindle 12 carries a tool, here for example a blade head 22 with several cutting blades. A workpiece spindle 30 is horizontally guided and linearly displacable or pivotable on the machine bed 21 by the second carriage 25 and by the first pivotable device 28. The first pivotable device 28 carries the workpiece spindle 30, which is rotatable about a workpiece spindle axis 32 (6th axis). The workpiece spindle 30 carries a workpiece 31, in the present example a helical bevel gear pinion. The first pivotable device 28 is horizontally guided pivotable about the C axis, in order to pivot the workpiece 31 into a working position. In addition a setting device is provided, in order to be able to perform in accordance with the invention a relative pivoting and/or setting movement between the deburring blade head 43 and the workpiece 31 for example. This second setting device is not shown in FIG. 1. The mentioned pivoting and/or setting movement serve for the deburring blade 43.1 of the deburring blade head 43 to be brought into a starting position. Then the workpiece 31 is rotated about the workpiece spindle axis 32 and the deburring blade head 43 about an axis of rotation E (7th axis) and the deburring blades 43.1 of the deburring blade head 43 perform respective chamfering and/or deburring movements in a continuous process at the pre-determined edges of the bevel gear pinion 31.

As indicated in FIG. 1, the rotation axis E of the deburring blade head 43 can run parallel to the C-axis, for example. But it is also possible to provide the rotation axis E of the deburring blade head 43 with an angle in respect to the C-axis. Further details of the deburring blade head 43 are described in one of the following sections.

Altogether the machine 20 also comprises in the example shown seven numerically controlled axes, if one does not provide a dedicated numeric control for the pivoting movement of the second pivoting device. Preferably however also for this pivoting movement a numerically controlled axis is provided. It is, however, also possible to employ machines with another number of axes, whereby at least five numerically controlled axes (for a intermittent working procedure) must be present.

In order to be able to realize deburring, according to the invention, in the continuous procedure, machines with at least six numerically controlled axes are particularly preferred.

However also other CNC gear-cutting machines can be re-equipped or equipped in accordance with the invention, whereby machines with seven or eight numerically controlled axes are preferred.

Figure 6:
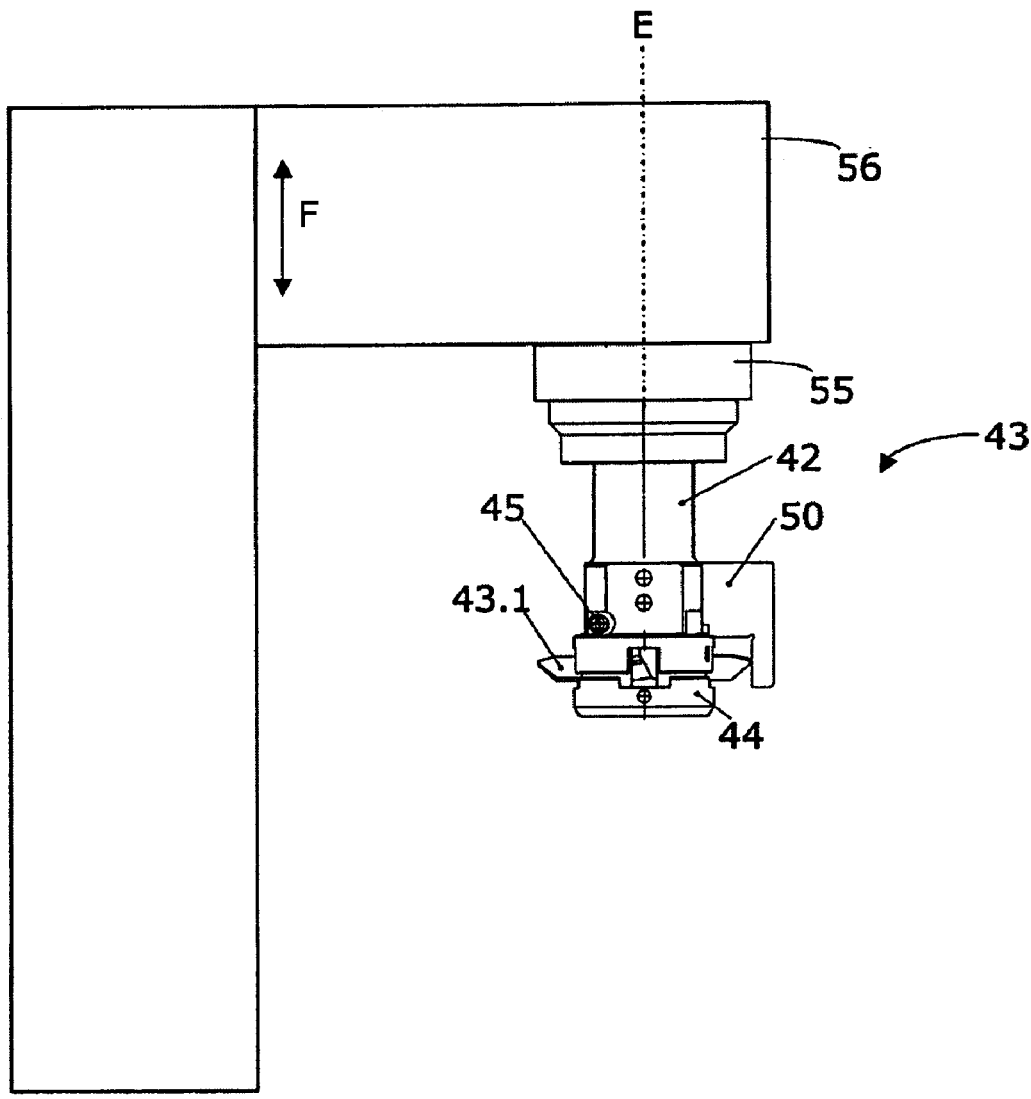
FIG. 6 is a front view of the further embodiment according to the present invention.

There exists also the possibility to equip a CNC gear-cutting machine with a separate deburring blade head, which is rotatable about the E-axis and movable along parallel to an F-axis, as indicated in FIG. 6. A setting device can also be provided, in order to be able to perform a setting and/or a pivoting movement relative to the workpiece, with which the deburring blade 43.1 of the deburring blade heads 43 is brought into the right starting position.

The gear-cutting machine 20 in accordance with the invention comprises, as already described, a workpiece spindle 30 which receives the bevel gear 31 to be worked on coaxially to the workpiece spindle axis 32. A first carriage 24 is provided with tool spindle 12, in order to receive a disk-shaped blade head 22 with several cutting blades. A further axis E is provided in order to receive and suitably turn a device 43, according to the invention, with several deburring blades 43.1. In addition a setting device 40 is provided, in order to bring the deburring blade head 43 into the right starting position. The gear-cutting machine 20 has, as mentioned, several, for example six, seven or eight, numerically controllable axes, which are controllable via a programmable control, whereby one of the axes forms the workpiece spindle axes 32 of the said workpiece spindle 30. Another axis serves as tool spindle axis 23 of the disk-shaped blade head 22 and an axis E serves as deburring spindle axis of the device 43 according to the invention with deburring blades 43.1. The numerically controllable axes are designed and arranged in such a way that, by adjusting at least one of the axes the workpiece spindle 30 including the bevel gear 31 is movable with respect to the deburring blade head 43 with the several deburring blades 43.1 so that the deburring blades 43.1 while concurrently rotating around the workpiece spindle axis 32 and the deburring blade head 43 with the deburring blades 43.1 around the deburring spindle axis E, successively plunging into gaps between teeth and performing a chamfering or a deburring movement in respect to the given edges of the bevel gear 31.

In a particularly preferred embodiment a rotation of the deburring blade head 43 around the deburring spindle axis E and a rotation of the workpieces 31 around the workpiece spindle axis 32 sufficient for chamfering and/or deburring.

In accordance with the invention one or more dedicated numerical control axes are preferably provided for the cutting movement of the deburring blade 43.1 of the deburring blade head 43. These NC axes serve(s) for moving the deburring blade head 43, as shown in the FIG. 2 to 5 on the basis of an example, relative to the workpiece 31. The deburring blade head 43 is screwed to a deburring spindle 55 via a plate 41 and screws 47 (see for example FIG. 6). A base holder 42 is provided, which comprises different elements for the receiving of deburring blades 43.1. The deburring blade head 43 comprises several bar-like blade inserts 43.1, which are insertable in recesses of the deburring blade head 43, whereby the blade inserts 43.1 are essentially oriented radially to the deburring spindle axis E of the deburring spindle 55, as for example shown in FIG. 5. Any of the blade inserts 43.1 comprise edges for chamfering and/or deburring the workpiece 31. An embodiment which is particularly advantageous is equipped with four blade inserts 43.1, whereby these blade inserts 43.1 are arranged in a mutual angle of 90 degrees. Instead of the recesses at the deburring blade head 43 different means of mounting can be provided for clamping or fastening the blade inserts 43.1.

Preferably the deburring blade head 43 is implemented in such a way that the individual deburring blades 43.1 can be released and taken out by loosening individual clamping screws 45. Thus the deburring blade head 43 can be differently equipped depending upon need. An embodiment, which provides one clamping ball 51 and one clamping element per blade insert 43.1, is particularly favorable, whereby the clamping element provides a clamping screw 55, a ball 52 with smaller diameter and a stud 53. To be recognized in the cross-sectional view in FIG. 4, the stud 53, the ball 52 and the clamping screw 45 are arranged one behind the other in a row in a hole of the base holder 42. The clamping ball 51 sits between the blade insert 43.1 and the clamping element. Now if the clamping screw 45 is screwed into the hole of the base holder 42, then the ball 52 shifts toward the deburring spindle axis E. By this shift the clamping ball 51 is pressed downward and the blade insert 43 is fixed. Preferably a set-screw with hexagon socket is used as clamping screw 45.

Figure 2:
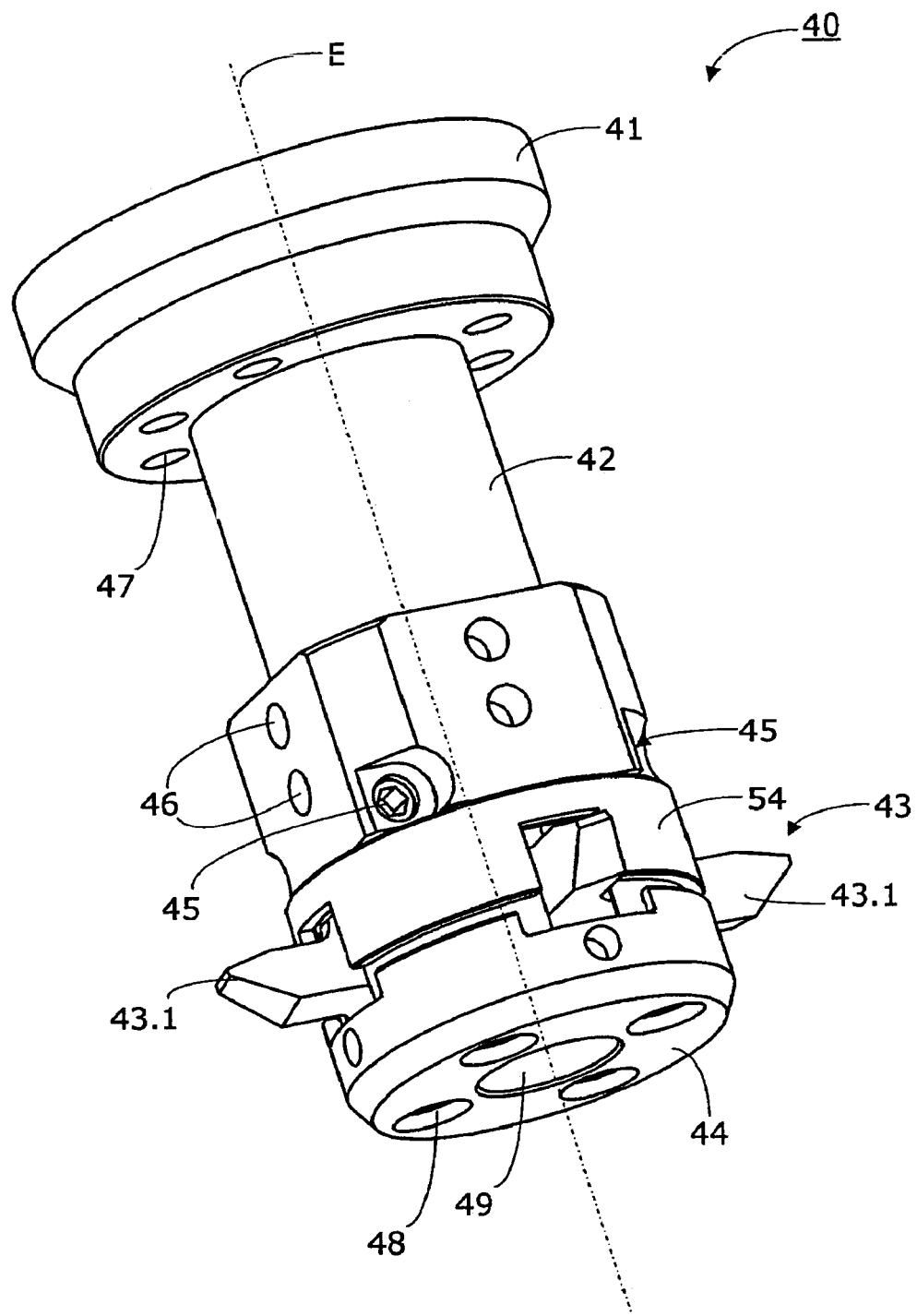
FIG. 2 is a perspective view of a first embodiment for use in a gear-cutting machine according to the present invention.
Figure 3:
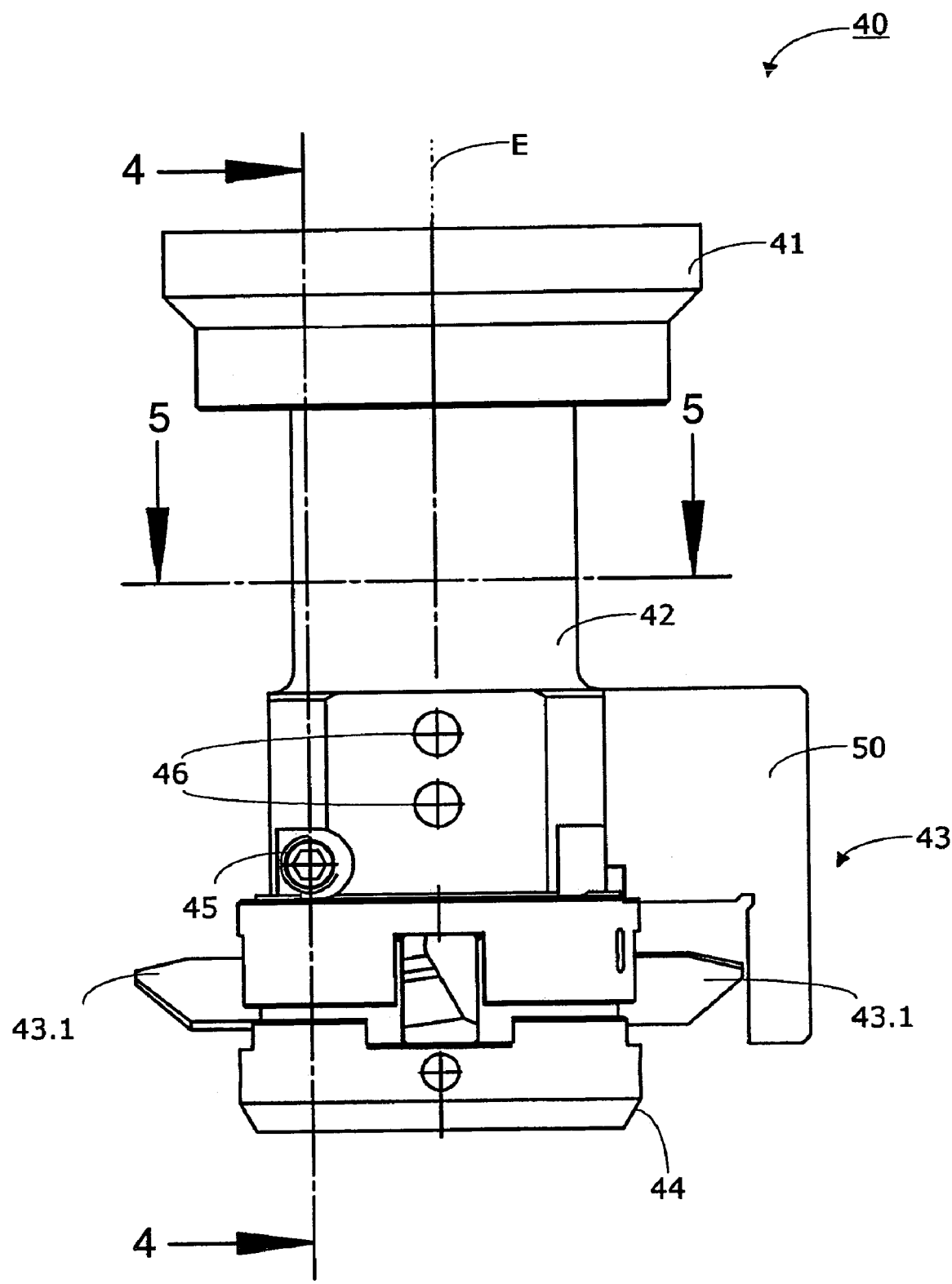
FIG. 3 is a front view of the first embodiment according to the present invention.
Figure 4:
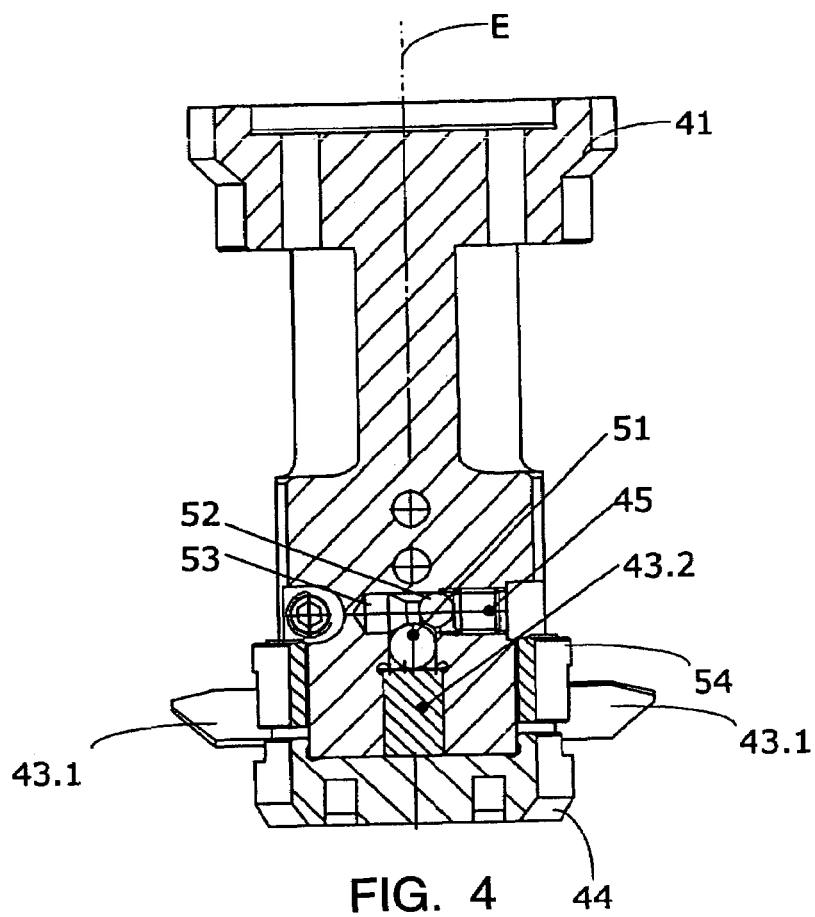
FIG. 4 is a first cross-sectional view of the first embodiment according to the present invention as viewed along section line 4-4 in FIG. 3.

A embodiment is preferred, which, as shown in the FIG 2 to 5, has a modular structure. The cylindrically formed base holder 42 comprises n (preferably with n32 1, 2, 3, 4, 5, 6) rectangular recesses in the lower part, whose size is designed for the cross section of the shaft of the blade inserts 43.1. In FIG. 4 a section is shown through the rectangular-shaped shaft 43.2 of a blade insert 43.1. A ring 54 can be pushed onto the lower part of the base holder 42, as is to be recognized in the FIGS. 2 to 4. The ring 54 has preferably recesses, which partly grab around the blade inserts 43.1.

In a further preferred embodiment a clamping cover 44 is provided, which covers the lower part of the deburring blade head 43, as is to be recognized in FIG. 2 The clamping cover 44 can be connected with the base holder 42 for example by a plug or a clamping joint. The clamping cover 44 may comprise four holes 48, which make an entrance possible to screws, which hold the clamping cover 44, which serves as counter element for the blade inserts 43.1. In the center of the clamping cover 44 an opening 49 is provided, in order to be able for example to put in or to screw in the shaft of an optional grinding brush. The shaft of the grinding brush then sits coaxially to the deburring spindle axis E.

Figure 5:
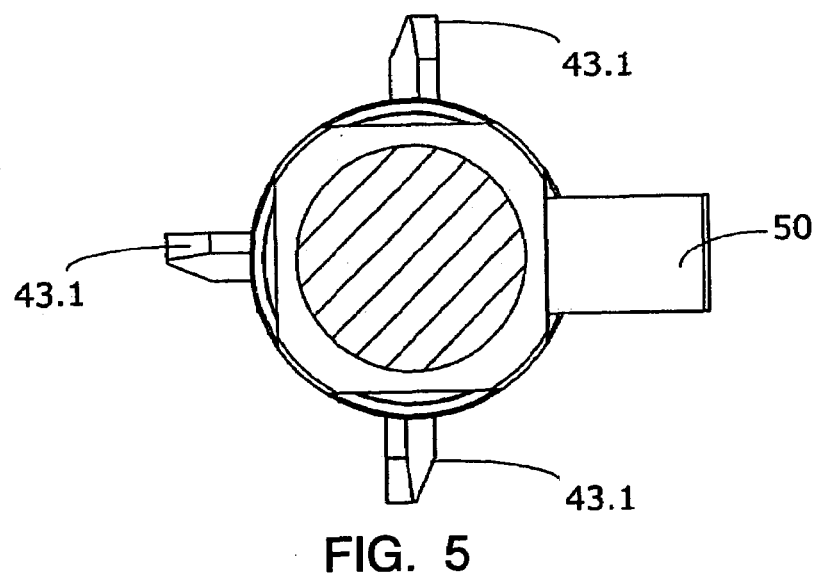
FIG. 5 is a second cross-sectional view of the first embodiment according to the present invention as viewed along section line 5-5 in FIG. 3.

Optionally the deburring blade head 43 can be as implemented so that a adjusting gauge 50 can be fastened, as shown for example in FIG. 3 and in FIG. 5. In the example shown the adjusting gauge 50 is located above a blade insert 43.1 at the base holder 42. A shank 50.1 of the adjusting gauge 50 defines exactly the point of the blade insert 43.1, which is most distant from the deburring spindle axis E in radial direction. The adjusting gauge 50 gives an exact position to the blade insert 43.1. After the blade insert 43.1 is fastened by tightening the clamping screw 45, the adjusting gauge 50 can be removed. Preferably the adjusting gauge 50 is fastened to the base holder 42 with two pins or screws. For this purpose two holes 46 can be provided above each blade insert 43.1 at the base holder 42.

A further embodiment is shown in FIG. 6. This embodiment is provided with a setting device 56, in order to be able to perform in accordance with the invention relative pivoting and/or setting movements between the deburring blade head 43 and a workpiece 31 not shown. The deburring blade head 43 is pivoting around the E-axis and is settable along parallel to an axis F, as indicated in FIG. 6.

In accordance with the invention the metal insert 43 is manufactured either from carbide, from tool steel or from cutting ceramic(s). This is a substantial difference from conventional deburring cutters. In a preferred embodiment micro grain carbide is used, because then the edges of the blade inserts 43.1 remain sharp for a long time and cut cleanly.

Blade inserts 43.1, which are polished in the area of the edges, are particularly favorable, whereby the blade inserts 43.1 preferably exhibit so-called two-flanks or a 3-flank grind. The 2-flank grind has the advantage that it is easier to be ground. 3-flank grind is favorable, since all three flanks are relatively freely selectable.

It is a special advantage of the device according to the invention that particularly designed deburring blade inserts 43.1 made of carbide can be used. These deburring blade inserts 43.1 can be so implemented that they exhibit the ideal geometry particularly for the deburring or chamfering of the respective bevel gear. In addition such deburring blade insert 43.1 can be relatively simply removed and reground, if the edge(s) should be blunt.

Furthermore the complicated re-equipping, which leads to user-caused errors, or waiting is cancelled in accordance with the invention, since a removal and an installation of the deburring cutters on the machine does not have to take place.

No considerable time delays develop for deburring on the gear-cutting machine, since owing to the use of special blade inserts 43.1 in the continuous procedure one can work with relatively high cutting speeds. Depending on the embodiment the time is sufficient, which is needed for transferring the workpiece 31 from a working on position into a removal position, in order to accomplish the chamfering or a deburring.

The invention claimed is:

1. A bevel gear cutting machine for chamfering and/or deburring edges of the teeth of a bevel gear in a continuous process, said machine having a plurality of numerically controllable axes and comprising:
    a workpiece spindle, which receives the bevel gear coaxially of a workpiece spindle axis,
    a deburring spindle having a deburring spindle axis generally orthogonal to the workpiece spindle axis for coaxially receiving a deburring tool, and
    a deburring tool having a deburring blade head and a plurality of bar-like blade inserts attachable to the deburring blade head, each of said blade inserts having a shaft for clamping and a free end with at least one edge for chamfering and/or deburring the edges of a bevel gear, wherein the deburring blade head comprises:
    a base holder extending along the deburring spindle axis, said base holder having a connection area at a first end of the base holder for fastening the base holder to the deburring spindle; and
    a plurality of blade insert mounting means attached proximate to a second, distal end of the base holder, for respectively clamping the blade insert shafts and holding the blade inserts generally radially oriented to the deburring spindle axis of the deburring spindle.

2. The bevel gear cutting machine according to claim 1, wherein the blade inserts are made of carbide, tool steel or cutting ceramic.

3. The bevel gear cutting machine according to claim 1, wherein the blade inserts are ground in the area of the edges, said blade inserts having a 2-flank or a 3-flank grind.

4. The bevel gear cutting machine according to claim 1, wherein each mounting means includes a recess in the deburring blade head for receiving one of the blade insert shafts.

5. The bevel gear cutting machine according to claim 1, wherein each mounting means includes a clamping screw for releasably clamping a blade insert.

6. The bevel gear cutting machine according to claim 1, wherein each mounting means comprises a clamping screw and a clamping element with one clamping ball for releasably clamping a blade insert.

7. The bevel gear cutting machine according to claim 1, wherein a setting device is provided, in order to be able to perform a relative setting and/or pivoting movement between the deburring blade head and the bevel gear, whereby the deburring blade head can be brought into a starting position for chamfering and/or deburring by the setting and/or pivoting movement.

8. The bevel gear cutting machine of claim 1 further comprising an adjusting gauge attached to the deburring blade head for defining the installation position of the blade inserts.

9. The bevel gear cutting machine of claim 1 further comprising a grinding brush interfaced with the deburring blade head, wherein a shaft of the grinding brush is coaxially aligned with the deburring spindle axis.

10. A method for chamfering and/or deburring edges on the teeth of a bevel gear in a gear-cutting machine having a plurality of numerically controllable axes, said machine comprising a workpiece spindle, which receives the bevel gear coaxially to an axis of the workpiece spindle, a tool spindle, which receives a tool, and a deburring spindle with a deburring spindle axis generally orthogonal to the workpiece spindle axis, said deburring spindle being provided for receiving a deburring blade head with several bar-like blade inserts, wherein the method comprises the following steps:
    inserting and fastening the blade inserts to the deburring blade head so that the blade inserts are generally radially oriented to the deburring spindle axis,
    performing a relative setting and/or pivoting movement between the deburring blade head and the bevel gear, wherein by the setting and/or pivoting movement the deburring blade head is brought into a starting position for chamfering and/or deburring,
    rotating the bevel gear around the workpiece spindle axis,
    rotating the deburring blade head around the deburring spindle axis, and
    with the blade inserts of the deburring blade head, performing chamfering and/or deburring movements in a continuous fashion at pre-determined edges of the bevel gear.

11. The method of claim 10 further comprising:
    fastening an adjusting gauge at the deburring blade head, in order to define the installation position of the blade inserts when inserting and fastening.

12. A bevel gear cutting machine for chamfering and/or deburring edges of the teeth of a bevel gear in a continuous process, said machine having a plurality of numerically controllable axes and comprising:
    a workpiece spindle, which receives the bevel gear coaxially of an axis of the workpiece spindle about which the bevel gear is rotated for machining operations thereon;
    a deburring spindle, which receives a deburring tool coaxially of an axis of the deburring spindle about which the deburring tool is rotated for deburring and/or chamfering operations on the bevel gear, said deburring spindle axis being generally orthogonal to the workpiece spindle axis; and
    a deburring tool having a deburring blade head and a plurality of blade insert bars attached to the deburring blade head, each of said blade insert bars comprising a shaft with a first end for clamping and a second, distal end with at least one edge for chamfering and/or deburring the edges of a bevel gear, wherein the deburring blade head comprises:
    a base holder extending along the deburring spindle axis and having first and second distal ends, said first end of the base holder being fastened to the deburring spindle; and
    a plurality of blade insert mounting assemblies attached proximate to the second end of the base holder, each mounting assembly being configured to clamp the first end of a blade insert shaft, for holding the blade insert generally radially oriented to the deburring spindle axis.

* * * * *